United States Patent
Miyata et al.

(10) Patent No.: US 9,734,452 B2
(45) Date of Patent: Aug. 15, 2017

(54) RECOMMENDATION INFORMATION PROVIDING DEVICE, MOBILE TERMINAL, RECOMMENDATION INFORMATION PROVIDING METHOD, RECOMMENDATION INFORMATION PROVISION SUPPORTING METHOD, AND RECORDING MEDIUM

(71) Applicant: BIGLOBE INC., Tokyo (JP)

(72) Inventors: Michitaro Miyata, Tokyo (JP); Kenji Shioume, Tokyo (JP); Kazuya Furukawa, Tokyo (JP)

(73) Assignee: BIGLOBE Inc. (JP)

( * ) Notice: Subject to any disclaimer, the term of this patent is extended or adjusted under 35 U.S.C. 154(b) by 374 days.

(21) Appl. No.: 14/375,852

(22) PCT Filed: Oct. 17, 2012

(86) PCT No.: PCT/JP2012/076764
§ 371 (c)(1),
(2) Date: Jul. 31, 2014

(87) PCT Pub. No.: WO2013/114686
PCT Pub. Date: Aug. 8, 2013

(65) Prior Publication Data
US 2015/0006461 A1    Jan. 1, 2015

(30) Foreign Application Priority Data
Feb. 1, 2012   (JP) .................................. 2012-019743

(51) Int. Cl.
*G06F 17/00*    (2006.01)
*G06N 5/02*    (2006.01)
(Continued)

(52) U.S. Cl.
CPC ........... *G06N 5/04* (2013.01); *G06F 17/3087* (2013.01)

(58) Field of Classification Search
None
See application file for complete search history.

(56) References Cited

U.S. PATENT DOCUMENTS

2007/0198784 A1* 8/2007 Miyata ................ G06F 11/2076
                                                        711/154
2008/0140908 A1* 6/2008 Miyata .................. G06F 3/0611
                                                        711/100

(Continued)

FOREIGN PATENT DOCUMENTS

JP    2002-366571 A    12/2002
JP    2002366517 A  *  12/2002

(Continued)

OTHER PUBLICATIONS

International Search Report—PCT/JP2012/076764—Nov. 27, 2012.

*Primary Examiner* — Paulinho E Smith
(74) *Attorney, Agent, or Firm* — Mark Malek; Paul J. Ditmyer; Widerman Malek, PL

(57) ABSTRACT

A recommendation information providing device that communicates with each of a mobile terminal used by a provider of recommendation information and a requester terminal used by a requester of the recommendation information includes: acquisition means for acquiring location information of the mobile terminal; memory means for storing the acquired location information; storage means for storing the recommendation information of the provider; and control means for, when receiving search area information for identifying a search area from the requester terminal, identifying a pertinent terminal which is the mobile terminal existing in the search area with reference to the memory (Continued)

means and transmitting pertinent recommendation information which is the recommendation information of the provider using the pertinent terminal to the requester terminal with reference to the storage means.

15 Claims, 12 Drawing Sheets

(51) Int. Cl.
*G06N 5/04* (2006.01)
*G06F 17/30* (2006.01)

(56) References Cited

U.S. PATENT DOCUMENTS

| | | | | |
|---|---|---|---|---|
| 2008/0271034 A1* | 10/2008 | Miyata | ............... | G06F 3/0605 718/104 |
| 2009/0164721 A1* | 6/2009 | Miyata | ............... | G06F 12/0873 711/114 |
| 2010/0023489 A1* | 1/2010 | Miyata | ............... | G06F 17/30 707/E17.01 |
| 2012/0290434 A1* | 11/2012 | Moritz | ............... | G06Q 30/0261 705/26.7 |
| 2013/0073358 A1* | 3/2013 | Sandholm | ............... | G06Q 30/0631 705/14.11 |
| 2014/0032453 A1* | 1/2014 | Eustice | ............... | G06F 17/2785 706/12 |
| 2014/0323078 A1* | 10/2014 | Miyata | ............... | H04W 76/007 455/404.1 |
| 2014/0324632 A1* | 10/2014 | Enomoto | ............... | G06Q 30/06 705/26.62 |
| 2015/0006461 A1* | 1/2015 | Miyata | ............... | G06N 5/04 706/50 |
| 2015/0120461 A1* | 4/2015 | Miyata | ............... | G06K 7/00 705/14.64 |
| 2015/0215449 A1* | 7/2015 | Hirata | ............... | H04M 3/38 379/142.05 |
| 2015/0234808 A1* | 8/2015 | Miyata | ............... | G06F 17/2735 704/10 |
| 2015/0365787 A1* | 12/2015 | Farrell | ............... | H04W 4/08 455/456.1 |

FOREIGN PATENT DOCUMENTS

| | | | |
|---|---|---|---|
| JP | 2007-13827 | | 1/2007 |
| JP | 2007013827 A | * | 1/2007 |
| JP | 2007-72860 A | | 3/2007 |
| JP | 2007-328469 | | 12/2007 |

* cited by examiner

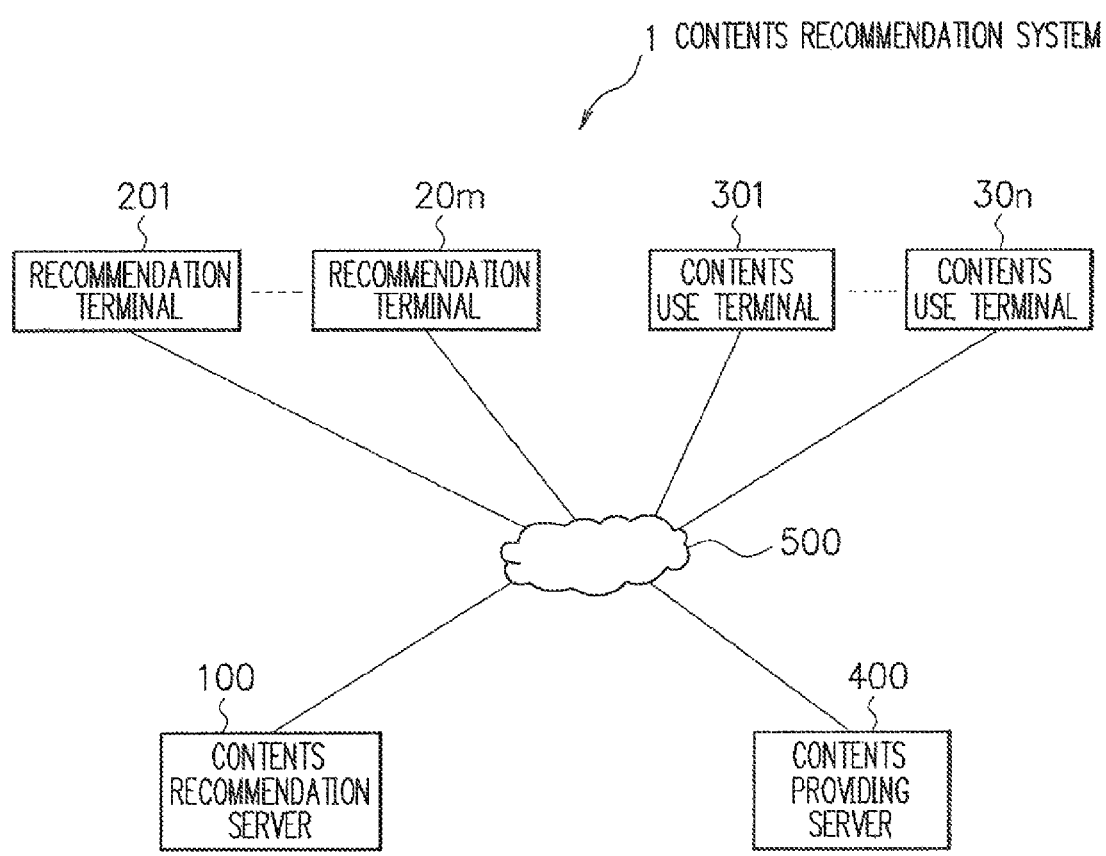
F I G. 1

F I G. 3

103 LOCATION INFORMATION MEMORY UNIT

| RECOMMENDER ID | LOCATION INFORMATION |
|---|---|
| ○○○ | ×××× |
| ⋮ | ⋮ |

F I G. 4

105 RECOMMENDATION INFORMATION MEMORY UNIT

| RECOMMENDER ID | RECOMMENDED CONTENTS ID |
|---|---|
| ○○○ | ・△×○○<br>・○△△△△ |
| ⋮ | ⋮ |

F I G. 5

106 REMUNERATION INFORMATION MEMORY UNIT

| RECOMMENDER ID | REMUNERATION INFORMATION |
|---|---|
| ○○○ | Aabb |
| ⋮ | ⋮ |

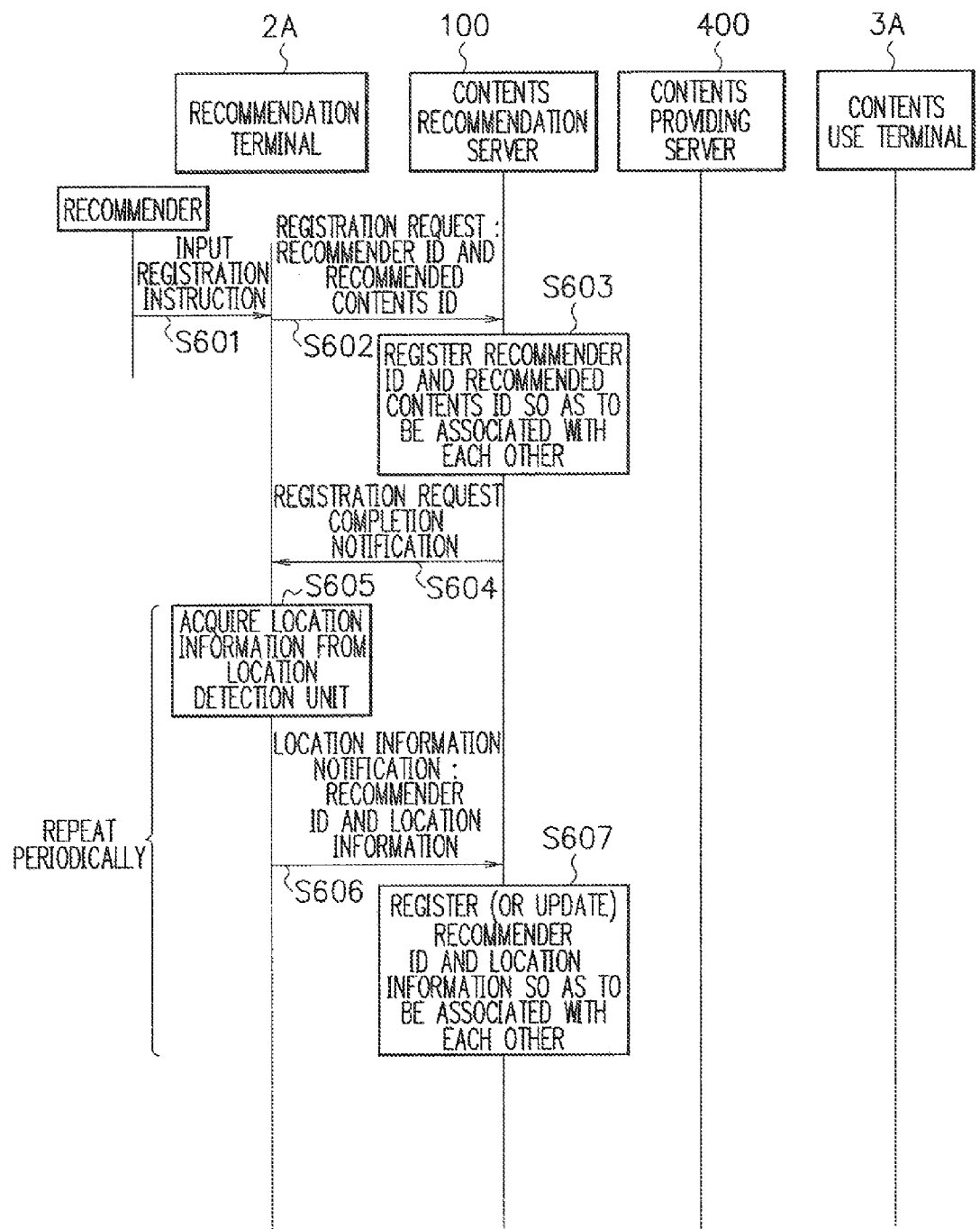

F I G. 7
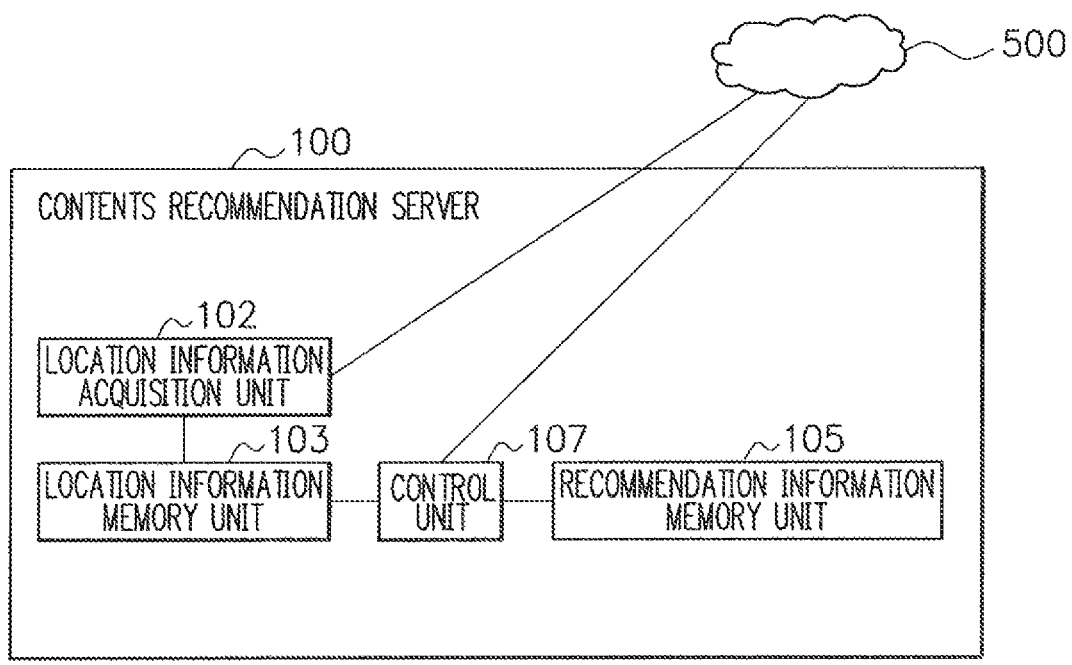

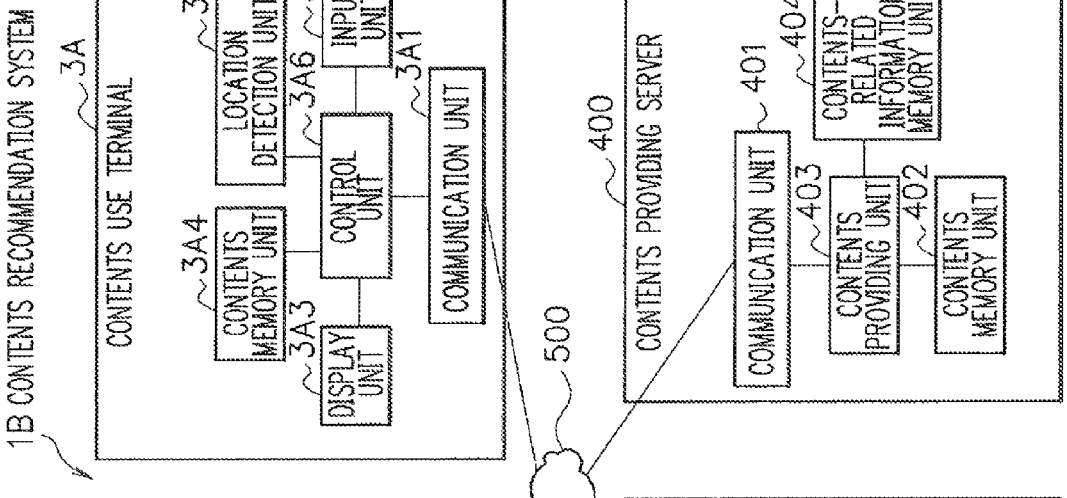
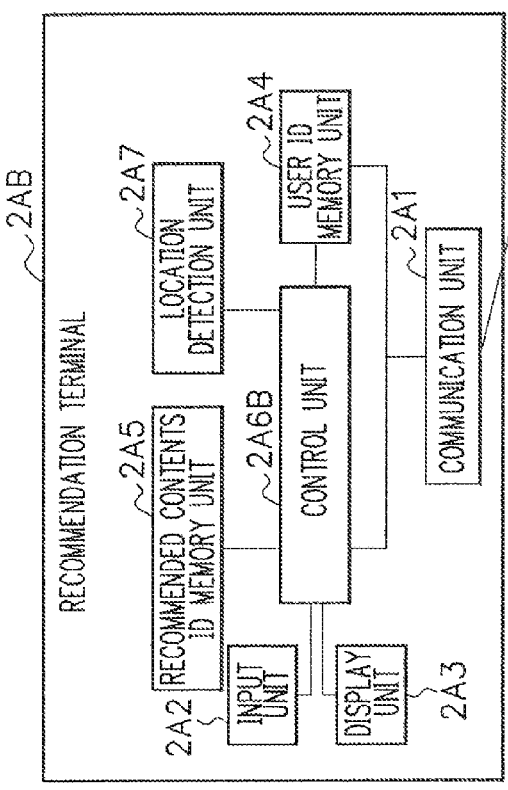
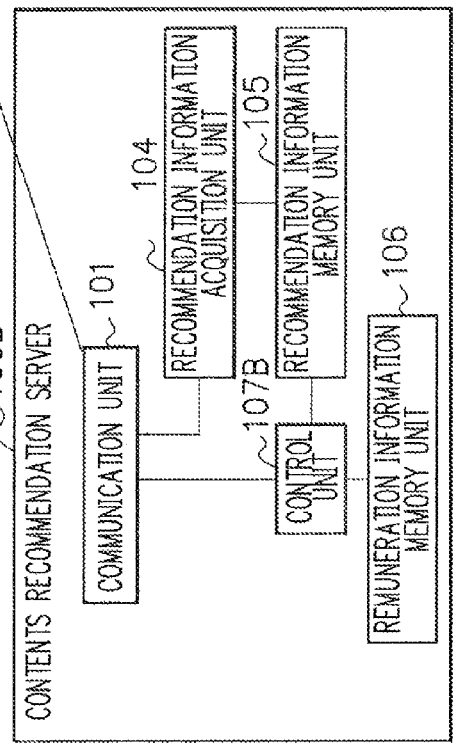
F I G. 10

RECOMMENDATION INFORMATION PROVIDING DEVICE, MOBILE TERMINAL, RECOMMENDATION INFORMATION PROVIDING METHOD, RECOMMENDATION INFORMATION PROVISION SUPPORTING METHOD, AND RECORDING MEDIUM

CROSS REFERENCE TO RELATED APPLICATIONS

This is a national stage application under 35 U.S.C. §371 of PCT patent application PCT/JP2012/076764, filed on Oct. 17, 2012, which claims the benefit of JP 2012-019743, filed on Feb. 1, 2012, each of which is hereby incorporated by reference in its entirety except to the extent that any disclosure therein conflicts with any disclosure herein.

TECHNICAL FIELD

The present invention relates to a recommendation information providing device, a mobile terminal, a recommendation information providing method, a recommendation information provision supporting method, and a recording medium.

BACKGROUND ART

Presently, there are cases where an object to be recommended is evaluated by reference to recommendation information indicative of the object to be recommended such as a product, service, a place or contents. The recommendation information is posted, for example, in a blog of the provider of the recommendation information.

Patent Document 1 describes a map information providing server that distributes recommendation information related to places of interest to mobile terminals.

The map information providing server described in Patent Document 1 stores locations registered by information providers (hereinafter, referred to as "registered locations"), and thereafter, when receiving a request for map information of a predetermined area from a user's mobile terminal, the map information providing server identifies an information provider registering a location in the predetermined area by use of the registered locations, and distributes the recommendation information, the registered location and the user information (for example, the profile) of the identified information provider to the mobile terminal.

The registered location is a fixed location where the information provider is normally located. The user information of the information provider distributed to the mobile terminal is information registered by the information provider himself/herself like the registered location.

PRIOR ART REFERENCE

Patent Document

Patent Document 1: JP 2007-328469 A

SUMMARY OF INVENTION

Problems to be Solved by the Invention

The user of the mobile terminal receiving the recommendation information from the map information providing server described in Patent Document 1 can acquire the registered location and the user information as attribute information related to the information provider providing the recommendation information.

However, the attribute information (the registered location and the user information) of the information provider is not always accurate information since it is registered by the information provider himself/herself. For this reason, the reliability of the attribute information of the information provider is low. The low reliability of the attribute information of the information provider can reduce the reliability of the recommendation information from the information provider.

For this reason, there is a problem in that a method for enhancing the reliability of the attribute information of the information provider is desired.

An object of the present invention is to provide a recommendation information providing device, a mobile terminal, a recommendation information providing method, a recommendation information provision supporting method and a recording medium capable of solving the above-mentioned problem.

Means for Solving to the Problems

A recommendation information providing device of the present invention is a recommendation information providing device that communicates with each of a mobile terminal used by a provider providing recommendation information indicative of an object to be recommended and a requester terminal used by a requester requesting the recommendation information, and includes:

acquisition means for acquiring location information of the mobile terminal;

memory means for storing the location information acquired by the acquisition means;

storage means for storing the recommendation information of the provider; and control means for, when receiving search area information for identifying a search area from the requester terminal, identifying a pertinent terminal which is the mobile terminal existing in the search area with reference to the memory means and transmitting pertinent recommendation information which is the recommendation information of the provider using the pertinent terminal to the requester terminal with reference to the storage means.

A recommendation information providing device of the present invention is a recommendation information providing device that communicates with each of a mobile terminal used by a provider providing recommendation information indicative of an object to be recommended and a requester terminal used by a requester requesting the recommendation information, and includes:

storage means for storing the recommendation information of the provider; and control means for, when receiving search area information for identifying a search area from the requester terminal, transmitting the search area information to the mobile terminal, and when receiving a response from a pertinent terminal which is the mobile terminal existing in the search area, transmitting pertinent recommendation information which is the recommendation information of the provider using the pertinent terminal to the requester terminal with reference to the storage means.

A recommendation information providing method of the present invention is a recommendation information providing method at a recommendation information providing device that communicates with each of a mobile terminal used by a provider providing recommendation information indicative of an object to be recommended and a requester terminal used by a requester requesting the recommendation information, and location information of the mobile terminal is acquired;

the acquired location information is stored in memory means;

the recommendation information of the provider is stored in storage means; and when search area information for identifying a search area is received from the requester terminal, a pertinent terminal which is the mobile terminal existing in the search area is identified with reference to the memory means, and pertinent recommendation information which is the recommendation information of the provider using the pertinent terminal is transmitted to the requester terminal with reference to the storage means.

A recommendation information providing method of the present invention is a recommendation information providing method at a recommendation information providing device that communicates with each of a mobile terminal used by a provider providing recommendation information indicative of an object to be recommended and a requester terminal used by a requester requesting the recommendation information, and the recommendation information of the provider is stored in storage means; and when search area information for identifying a search area is received from the requester terminal, the search area information is transmitted to the mobile terminal, and when receiving a response from a pertinent terminal which is the mobile terminal existing in the search area, pertinent recommendation information which is the recommendation information of the provider using the pertinent terminal is transmitted to the requester terminal with reference to the storage means.

A recording medium of the present invention is a computer-readable recording medium recording a program for causing a computer to execute:

an acquisition procedure of acquiring location information of a mobile terminal used by a provider providing recommendation information indicative of an object to be recommended;

a memory procedure of storing the acquired location information to memory means;

a storage procedure of storing the recommendation information of the provider in storage means; and a control procedure of, when receiving search area information for identifying a search area from a requester terminal used by a requester requesting the recommendation information, identifying a pertinent terminal which is the mobile terminal existing in the search area with reference to the storage means, and transmitting pertinent recommendation information which is the recommendation information of the provider using the pertinent terminal to the requester terminal with reference to the storage means.

A recording medium of the present invention is a computer-readable recording medium recording a program for causing a computer to execute:

a storage procedure of storing in storage means recommendation information indicative of an object to be recommended, provided by a provider using a mobile terminal; and a control procedure of, when receiving search area information for identifying a search area from the requester terminal used by a requester requesting the recommendation information, transmitting the search area information to the mobile terminal, and when receiving a response from a pertinent terminal which is the mobile terminal existing in the search area, transmitting pertinent recommendation information which is the recommendation information of the provider using the pertinent terminal to the requester terminal with reference to the storage means.

Advantageous Effects of the Invention

According to the present invention, the reliability of the attribute information of the information provider providing the recommendation information can be enhanced.

BRIEF DESCRIPTION OF THE DRAWINGS

FIG. 1 A block diagram showing a contents recommendation system 1 having a contents recommendation server 100 of a first embodiment of the present invention.

FIG. 3 A view showing an example of location information stored in a location information memory unit 103.

FIG. 4 A view showing an example of recommendation information stored in a recommendation information memory unit 105.

FIG. 5 A view showing an example of remuneration information stored in a remuneration information memory unit 106.

FIG. 6A A sequence diagram for explaining the operation of the contents recommendation system 1.

FIG. 7 A view showing the contents recommendation server including a location information acquisition unit 102, the location information memory unit 103, the recommendation information memory unit 105 and a control unit 107.

FIG. 10 A block diagram showing a contents recommendation system 1B having a contents recommendation server 100B of a third embodiment of the present invention.

DESCRIPTION OF THE EMBODIMENTS

Figure 2:
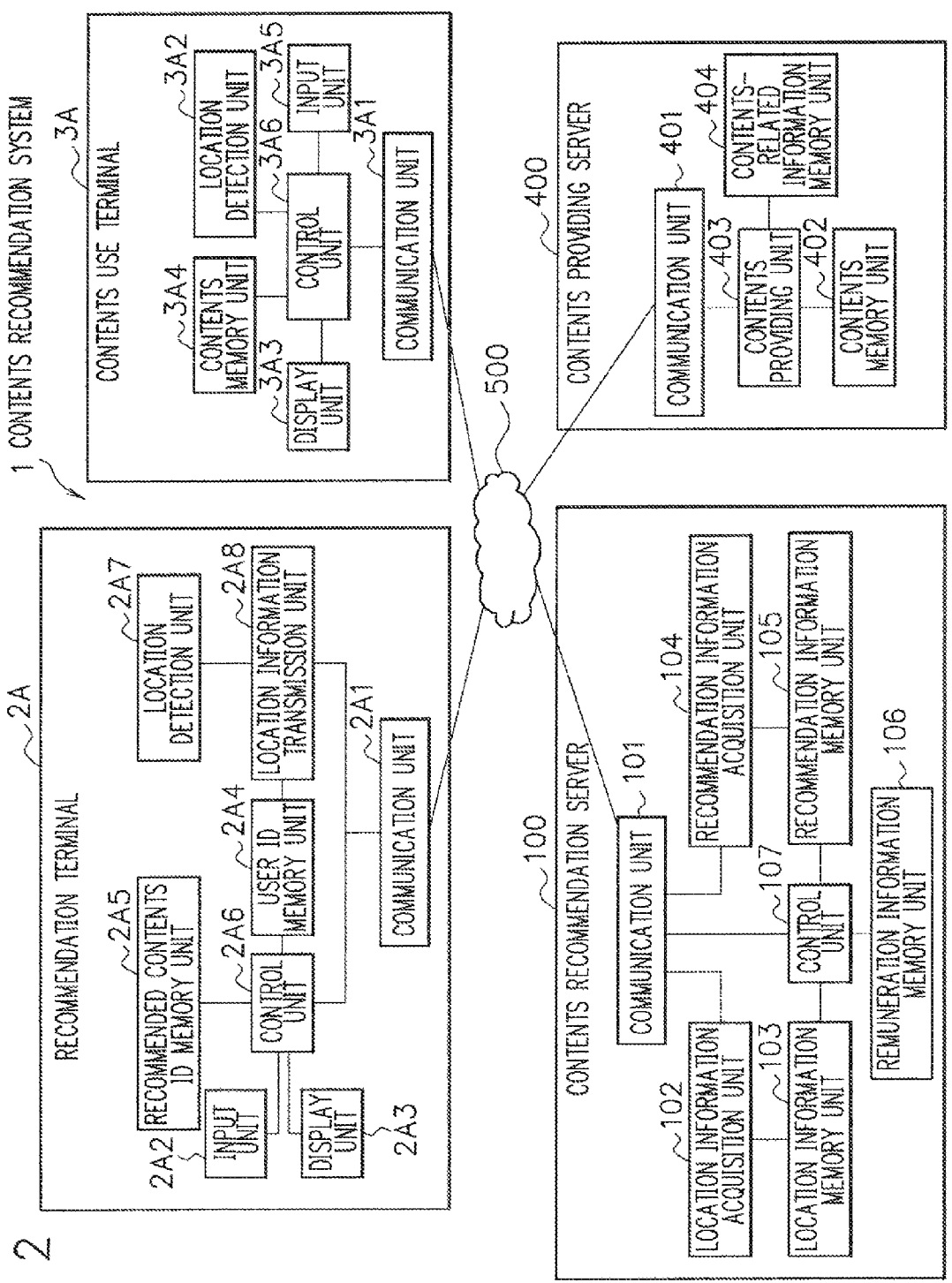
FIG. 2 A block diagram showing an example of the contents recommendation system 1.

Hereinafter, embodiments of the present invention will be described with reference to the drawings.

(First Embodiment)

FIG. 1 is a block diagram showing a contents recommendation system 1 having a contents recommendation server 100 of a first embodiment of the present invention.

In FIG. 1, the contents recommendation system 1 includes the contents recommendation server 100, recommendation terminals 201 to 20m (here, m is an integer not less than 1), contents use terminals 301 to 30n (here, n is an integer not less than 1), and a contents providing server 400.

The contents recommendation server 100, the recommendation terminals 201 to 20m, the contents use terminals 301 to 30n and the contents providing server 400 are connected to a network 500, and communicate with one another.

The contents recommendation server 100 is an example of the recommendation information providing device.

The contents recommendation server 100 communicates with each of the recommendation terminals 201 to 20m and the contents use terminals 301 to 30n.

The recommendation terminals 201 to 20m are each a mobile terminal such as a mobile telephone. The recommendation terminals 201 to 20m are not limited to mobile telephones, but may be any mobile terminal devices connectable to the network 500.

The recommendation terminals 201 to 20m are each used by a provider providing recommendation information indicative of an object to be recommended. Hereinafter, the provider providing recommendation information will be referred to as "recommender". It is assumed that the recommendation terminals 201 to 20m are used by different recommenders.

In the present embodiment, as the object to be recommended, contents recommended by the recommender are used. As the recommendation information, contents identification information for identifying the contents recommended by the recommender (hereinafter, referred to as "recommended contents ID") will be used.

The object to be recommended is not limited to contents, but may be, for example, goods or service and may be changed as appropriate. The recommendation information is not limited to the recommended contents ID, but may be any information for identifying the object to be recommended (for example, goods, service or contents).

The contents use terminals 301 to 30n are each a mobile terminal such as a mobile telephone. The contents use terminals 301 to 30n are not limited to mobile telephones, but may be any terminal devices connectable to the network 500.

The contents use terminals 301 to 30n are each used by a requester requesting recommendation information. Hereinafter, the requester requesting recommendation information will be referred to as a "contents user". It is assumed that the contents use terminals 301 to 30n are used by different contents users.

The contents recommendation server 100 provides the recommended contents ID recommended by a recommender existing in a search area specified by a contents use terminal to the contents use terminal specifying the search area.

Therefore, when a location where people with a similar attribute gather (for example, a conference hall where a conference or a workshop is being held, or a venue where a concert is being held) is specified as the search area, the contents user can acquire the recommended contents ID recommended by a person actually coming to the place.

For example, when a conference hall where a conference for which people in an industry gather is being held is specified as the search area, there is a very high probability that the person (recommender: information provider) providing the recommended contents ID acquired by the contents user is a person involved in the industry, so that the reliability of the attribute (specifically, an attribute of being involved in the industry) of the person providing the recommended contents ID acquired by the contents user is high.

When a venue where a concert is being held is specified as the search area, there is a very high probability that the person (recommender: information provider) providing the recommended contents ID acquired by the contents user has a preference for the concert, so that the reliability of the attribute (specifically, an attribute of having a preference for the concert) of the person providing the recommended contents ID acquired by the contents user is high.

Therefore, the reliability of the attribute of the recommender (information provider) recommending the recommended contents ID can be enhanced.

The contents providing server 400 provides, for example, contents identified by the recommended contents ID which is recommendation information.

The network 500 may be a wireless network, may be a wired network, or may be a network where a wireless network and a wired network coexist.

FIG. 2 is a block diagram showing an example of a recommendation terminal 2A usable as each of the recommendation terminals 201 to 20m, a contents use terminal 3A usable as each of the contents use terminals 301 to 30n, the contents recommendation server 100 and the contents providing server 400.

In FIG. 2, the recommendation terminal 2A includes a communication unit 2A1, an input unit 2A2, a display unit 2A3, a user ID memory unit 2A4, a recommended contents ID memory unit 2A5, a control unit 2A6, a location detection unit 2A7, and a location information transmission unit 2A8.

The contents use terminal 3A includes a communication unit 3A1, a location detection unit 3A2, a display unit 3A3, a contents memory unit 3A4, an input unit 3A5, and a control unit 3A6.

The contents recommendation server 100 includes a communication unit 101, a location information acquisition unit 102, a location information memory unit 103, a recommendation information acquisition unit 104, a recommendation information memory unit 105, a remuneration information memory unit 106, and a control unit 107.

The contents providing server 400 includes a communication unit 401, a contents memory unit 402, a contents providing unit 403, and a contents-related information memory unit 404.

First, the recommendation terminal 2A will be described.

The communication unit 2A1 connects with the network 500.

The input unit 2A2 accepts an input from the recommender. As the input from the recommender, for example, an input to the effect that the recommender's recommendation information is registered in the contents recommendation server 100 (hereinafter, referred to as "registration instruction input") is used.

The display unit 2A3 displays various pieces of information.

The user ID memory unit 2A4 stores the recommender's identification information (hereinafter, referred to as "recommender ID"). Since the recommendation terminal 2A and the recommender correspond one-to-one to each other, the recommender ID also functions as information for identifying the recommendation terminal. Moreover, identification information to identify the recommendation terminal (the ID, the IP address, the MAC address, the telephone number or the like unique to the device) may be used instead of the recommender's identification information.

The recommended contents ID memory unit 2A5 stores the recommended contents ID for identifying the contents recommended by the recommender. For example, the recommended contents ID is inputted through the input unit 2A2.

The control unit 2A6 operates in accordance with the input accepted by the input unit 2A2.

For example, when the input unit 2A2 accepts the registration instruction input, the control unit 2A6 transmits a recommendation information registration request indicative of the recommender ID in the user ID memory unit 2A4 and the recommended contents ID in the recommended contents ID memory unit 2A5 (hereinafter, referred to merely as "registration request") to the contents recommendation server 100 through the communication unit 2A1.

The location detection unit 2A7 detects the current location of the recommendation terminal 2A. In the present embodiment, the location detection unit 2A7 detects the current location of the recommendation terminal 2A periodically (for example, every five minutes) by using the GPS (Global Positioning System). The location detection unit 2A7 is not limited to the one that detects the current location by using the GPS, but may be changed as appropriate as long as it is one that detects the location of the own device such as one that identifies the location of the own device from the location of a base station with which communication is possible. The interval of detection of the current location of the recommendation terminal 2A is not limited to five minutes but may be changed as appropriate.

The location information transmission unit 2A8 transmits a location information notification indicative of the result of the detection by the location detection unit 2A7 (hereinafter, referred to as "location information") and the recommender ID in the user ID memory unit 2A4, to the contents recommendation server 100 through the communication unit 2A1.

In the present embodiment, every time the location detection unit 2A7 detects the current location, the location information transmission unit 2A8 transmits the location information notification indicative of the latest detection result to the contents recommendation server 100.

Subsequently, the contents use terminal 3A will be described.

The communication unit 3A1 connects with the network 500.

The location detection unit 3A2 detects the current location of the contents use terminal 3A. In the present embodiment, the location detection unit 3A2 detects the current location of the contents use terminal 3A periodically (for example, every five minutes) by using the GPS. The location detection unit 3A2 is not limited to the one that detects the current location by using the GPS, but may be changed as appropriate as long as it is one that detects the location of the own device such as one that identifies the location of the own device from the location of a base station with which communication is possible. The time interval of detection of the current location of the contents use terminal 3A is not limited to five minutes but may be changed as appropriate.

The display unit 3A3 displays various pieces of information.

The contents memory unit 3A4 stores the contents acquired by the contents use terminal 3A.

The input unit 3A5 accepts the input from the contents user.

As the input from the contents user, for example, an input to the effect that the recommended contents information indicative of the recommended contents ID (hereinafter, referred to as "acquisition instruction input") or an input to the effect that contents are downloaded (hereinafter, referred to as "download instruction input") is used.

The control unit 3A6 controls the operation of the contents use terminal 3A.

For example, when the input unit 3A5 accepts the acquisition instruction input, the control unit 3A6 transmits a recommended contents information acquisition request (hereinafter, referred to merely as "acquisition request") indicative of the result of the detection by the location detection unit 3A2 (hereinafter, referred to as "reference information") and area information indicative of a search area identified with reference to the location indicated by the reference information, to the contents recommendation server 100 through the communication unit 3A1.

The area information is an example of the search area information.

The area information indicates that, for example, an area within a circle with the position indicated by the reference information at the center and having a predetermined radius from the center is the search area. The predetermined radius may be set by the contents user or may be set as the default at the control unit 3A6.

Moreover, when receiving the recommended contents information transmitted from the contents recommendation server 100 in response to the acquisition request, the control unit 3A6 acquires relevant information (for example, the name or the icon of the contents, or an explanation of the contents) of the contents identified by the recommended contents ID indicated by the recommended contents information from the contents providing server 400, and displays the relevant information of the contents on the display unit 3A3.

Moreover, when the input unit 3A5 accepts the download instruction input about the recommended contents ID, the control unit 3A6 transmits a download request to request for downloading of the contents identified by the recommended contents ID, to the contents providing server 400 through the communication unit 3A1.

Moreover, when receiving the contents transmitted from the contents providing server 400 in response to the download request, the control unit 3A6 stores the contents in the contents memory unit 3A4.

Subsequently, the contents recommendation server 100 will be described.

The communication unit 101 connects with the network 500.

The location information acquisition unit 102 is an example of the acquisition means.

The location information acquisition unit 102 acquires the location information indicative of the current location of the recommendation terminal 2A. In the present embodiment, the location information acquisition unit 102 receives the location information notification transmitted from the recommendation terminal 2A through the communication unit 101 to thereby acquire the location information of the recommendation terminal 2A.

The location information memory unit 103 is an example of the memory means.

The location information memory unit 103 stores the location information in the location information notification acquired by the location information acquisition unit 102.

FIG. 3 is a view showing an example of the location information stored in the location information memory unit 103.

In FIG. 3, for each recommender ID in the location information notification, the location information memory unit 103 stores the location information so as to be associated with the recommender ID.

Every time the location information notification indicative of a recommender ID is acquired, the location information stored so as to be associated with the recommender ID in the location information memory unit 103 is updated to the location information indicated by the location information notification. In the location information memory unit 103, the recommender ID and the location information correspond one-to-one to each other.

The recommendation information acquisition unit 104 receives the registration request transmitted from the recommendation terminal 2A through the communication unit 101 to thereby acquire the recommendation information (recommended contents ID) of the recommender using the recommendation terminal 2A.

The recommendation information memory unit 105 is an example of the storage means.

The recommendation information memory unit 105 stores the recommendation information acquired by the recommendation information acquisition unit 104.

FIG. 4 is a view showing an example of the recommendation information stored in the recommendation information memory unit 105.

In FIG. 4, for each recommender ID in the registration request, the recommendation information memory unit 105 stores the recommended contents ID (recommendation information) so as to be associated with the recommender ID.

In the recommendation information memory unit 105, the recommender ID and the recommended contents ID associated with each other are in a one-to-a (here, a is an integer not less than 1) relationship.

The remuneration information memory unit 106 stores remuneration information for each recommender ID in the registration request. The remuneration information indicates the remuneration (part of the price of the contents, points, an evaluation) provided to the recommender when the contents recommended by the recommender are downloaded at a contents user terminal.

FIG. 5 is a view showing an example of the remuneration information stored in the remuneration information memory unit 106.

In FIG. 5, for each recommender ID in the registration request, the remuneration information memory unit 106 stores the remuneration information so as to be associated with the recommender ID.

The control unit 107 is an example of the control means.

When receiving the acquisition request from the contents use terminal 3A, the control unit 107 identifies the recommendation terminal 2A existing in the search area indicated by the acquisition request (hereinafter, referred to as "pertinent terminal") with reference to the location information memory unit 103 (see FIG. 3).

For example, the control unit 107 identifies the location information indicative of a location in the search area (hereinafter, referred to as "pertinent location information") from the location information in the location information memory unit 103, and identifies as the pertinent terminal the recommendation terminal 2A identified by the recommender ID associated with the pertinent location information. Hereinafter, the recommender ID associated with the pertinent location information will be referred to as "pertinent recommender ID".

After identifying the pertinent terminal, the control unit 107 identifies the recommendation information of the recommender using the pertinent terminal (hereinafter, referred to as "pertinent recommendation information") with reference to the recommendation information memory unit 105. The control unit 107 transmits the pertinent recommendation information to the contents use terminal 3A which is the source of the acquisition request.

In the present embodiment, the control unit 107 performs predetermined statistical processing on the pertinent recommendation information, and assigns a priority to the pertinent recommendation information based on the result of the predetermined statistical processing. The control unit 107 transmits the pertinent recommendation information assigned with the priority to the contents use terminal 3A which is the source of the acquisition request.

Moreover, in the present embodiment, the control unit 107 generates a list indicative of the pertinent recommender ID (hereinafter, referred to as "recommender list"), and assigns a recommender list identifier to each recommender list. Then, the control unit 107 sets the recommender list identifier or the recommender list as recommender list identification information. Then, the control unit 107 transmits the recommender list identification information to the contents use terminal 3A which is the source of the acquisition request together with the pertinent recommendation information assigned with the priority.

The contents recommendation server 100 is provided with a recommender list memory unit (not shown) that temporarily stores the recommender list.

Moreover, the control unit 107 may generate the recommender list and the recommender list identifier for each acquisition request from the contents use terminal and delete the recommender list in the recommender list memory unit at a time such as at the time of reception of the next acquisition request from the same contents use terminal, after the addition of the remuneration information or after a predetermined time.

Then, the contents providing server 400 will be described.

The communication unit 401 connects with the network 500.

The contents memory unit 402 stores various pieces of information.

When receiving the download request from the contents use terminal 3A, the contents providing unit 403 reads the contents requested by the download request from the contents memory unit 402, and transmits the contents to the contents use terminal 3A which is the source of the download request.

The contents-related information memory unit 404 stores the relevant information of the contents (for example, at least one of the name or the icon of the contents and an explanation of the contents) so as to be associated with the contents ID (recommended contents ID).

Next, the operation will be described.

Figure 6B:
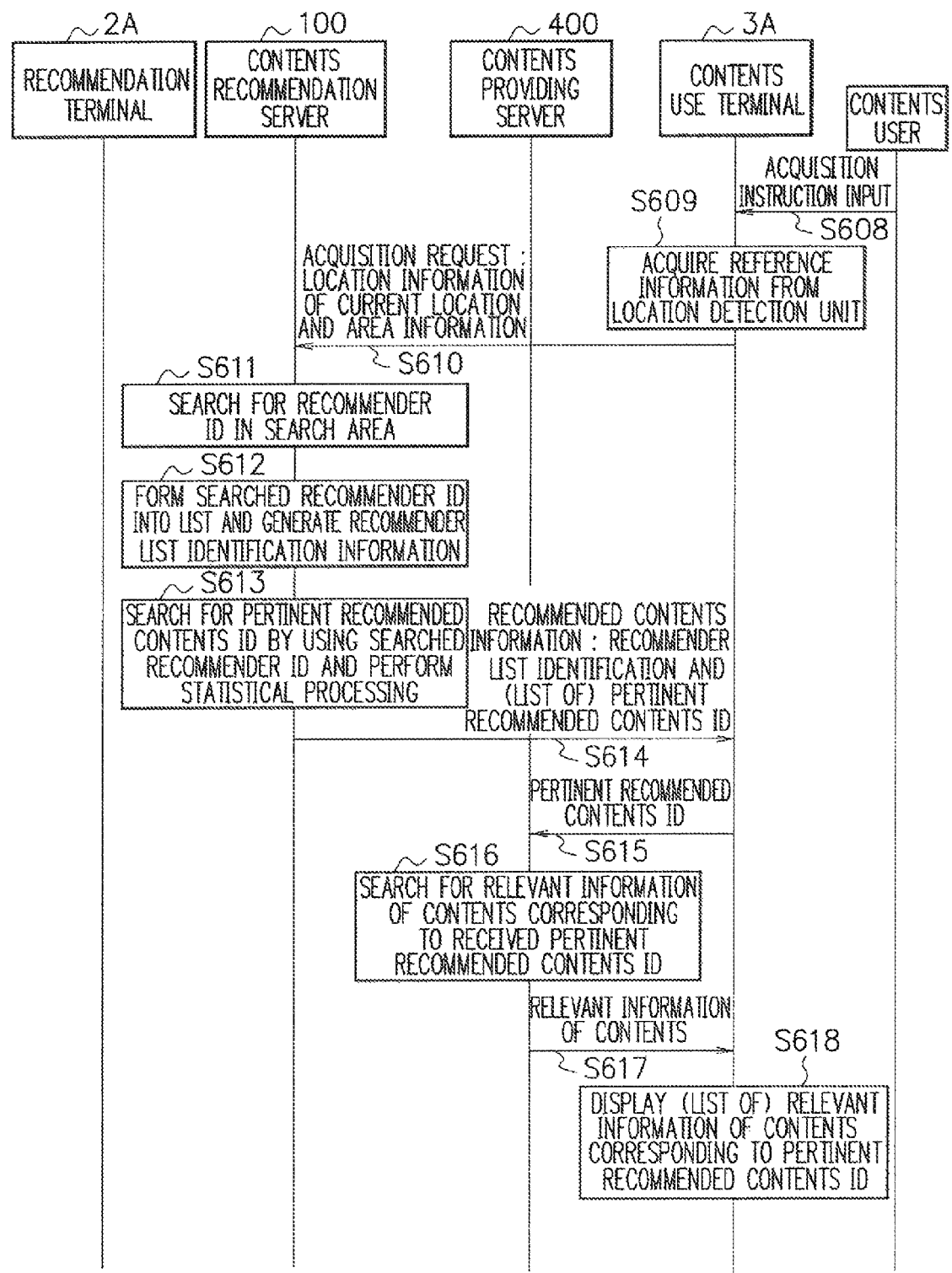
FIG. 6B A sequence diagram for explaining the operation of the contents recommendation system 1.
Figure 6C:
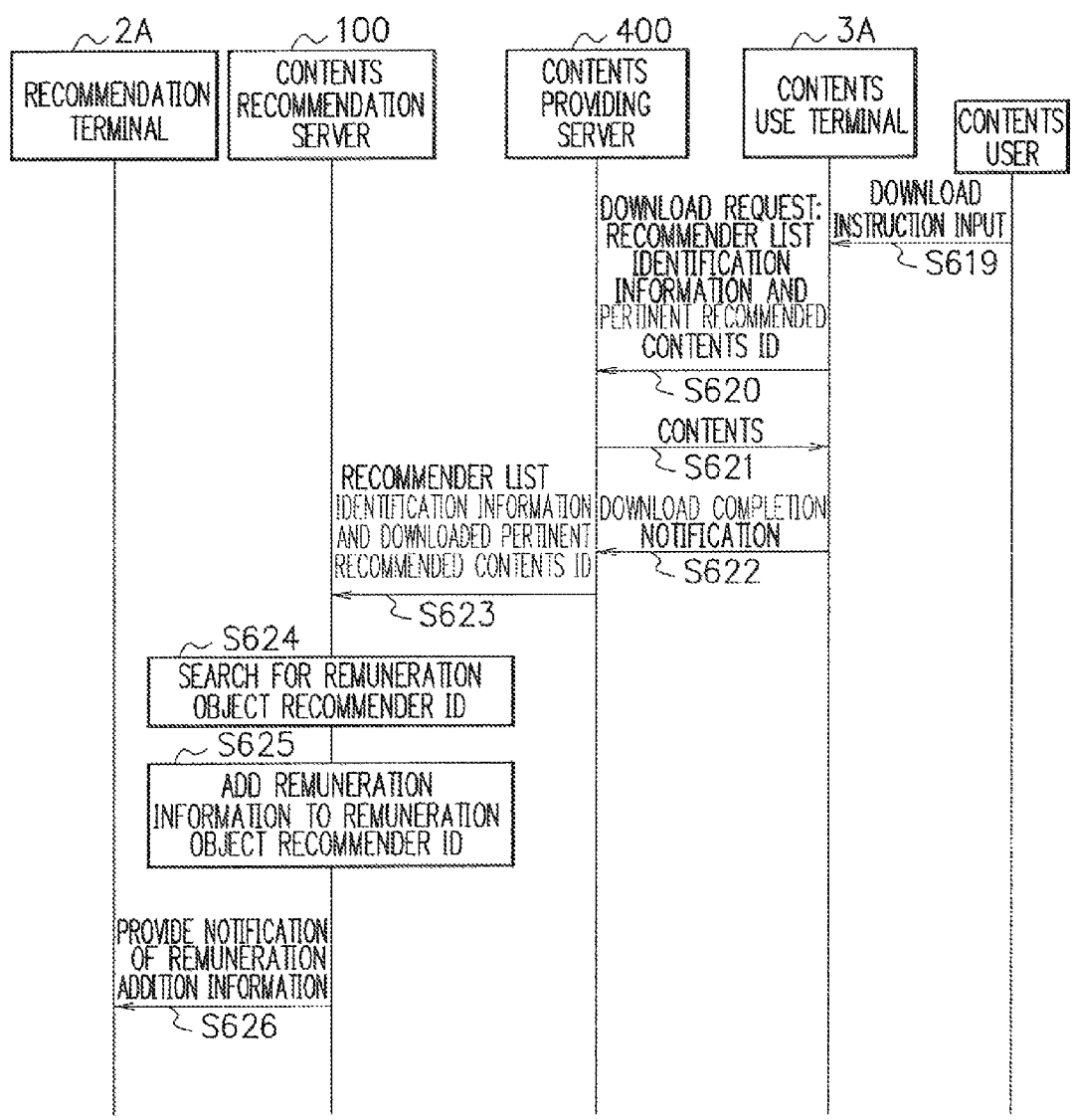
FIG. 6C A sequence diagram for explaining the operation of the contents recommendation system 1.

FIGS. 6A, 6B and 6C are sequence diagrams for explaining the operation of the contents recommendation system 1.

When the recommender using the recommendation terminal 2A inputs a registration instruction input to the input unit 2A2 (step S601), the input unit 2A2 outputs the registration instruction input to the control unit 2A6.

When accepting the registration instruction input, the control unit 2A6 reads the recommender ID from the user ID memory unit 2A4, and reads the recommended contents ID from the recommended contents ID memory unit 2A5.

Then, the control unit 2A6 generates a registration request indicative of the recommender ID read from the user ID memory unit 2A4 and the recommended contents ID read from the recommended contents ID memory unit 2A5, and transmits the registration request to the contents recommendation server 100 through the communication unit 2A1 (step S602).

At the contents recommendation server 100, when receiving the registration request through the communication unit 101, the recommendation information acquisition unit 104 registers the recommended contents ID indicated by the registration request in the recommendation information memory unit 105 so as to be associated with the recommender ID indicated by the registration request (step S603).

After completing the registration of the recommended contents ID, the recommendation information acquisition unit 104 transmits a notification of the completion of the registration request (registration request completion notification) to the recommendation terminal 2A which is the source of the registration request through the communication unit 101 (step S604), and ends the registration processing on the recommended contents ID.

At the recommendation terminal 2A, the location detection unit 2A7 periodically detects the current location of the recommendation terminal 2A (step S605). Every time detecting the current location of the recommendation terminal 2A, the location detection unit 2A7 outputs the location information which is the detection result to the location information transmission unit 2A8.

Every time accepting the location information from the location detection unit 2A7, the location information transmission unit 2A8 reads the recommender ID from the user ID memory unit 2A4.

Then, the location information transmission unit 2A8 generates a location information notification indicative of the recommender ID read from the user ID memory unit 2A4 and the location information from the location detection unit 2A7, and transmits the location information notification to the contents recommendation server 100 through the communication unit 2A1 (step S606).

At the contents recommendation server 100, when receiving the location information notification through the communication unit 101, the location information acquisition unit 102 determines whether the recommender ID indicated by the location information notification has already been stored in the location information memory unit 103 or not.

When the recommender ID has not been stored in the location information memory unit 103, the location information acquisition unit 102 registers the recommender ID and the location information indicated by the location information notification in the location information memory unit 103 so as to be associated with each other, and when the recommender ID has already been stored in the location information memory unit 103, the location information acquisition unit 102 updates the location information stored in the location information memory unit 103 so as to be associated with the recommender ID, to the location information indicated by the location information notification (step S607).

Then, when at a conference hall where a workshop is being held, the contents user using the contents use terminal 3A inputs an acquisition instruction input to the input unit 3A5 in order to acquire the recommended contents ID recommended by a participant of the workshop (that is, a person having an attribute of being interested in the workshop) (step S608), the input unit 3A5 outputs the acquisition instruction input to the control unit 3A6.

When accepting the acquisition instruction input, the control unit 3A6 acquires the reference information which is the result of the detection by the location detection unit 3A2 from the location detection unit 3A2 (step S609).

When acquiring the reference information, the control unit 3A6 generates an acquisition request indicative of area information indicative of the search area identified with reference to the location indicated by the reference information and the reference information, and transmits the acquisition request to the contents recommendation server 100 through the communication unit 3A1 (step S610). In this case, the search area indicated by the acquisition request is the area to which the conference hall where the workshop is being held belongs.

At the contents recommendation server 100, when receiving the acquisition request through the communication unit 101, the control unit 107 identifies the pertinent location information indicative of a location in the search area indicated by the acquisition request from the location information in the location information memory unit 103, and identifies the pertinent recommender ID associated with the pertinent location information (step S611).

Since the pertinent recommender ID corresponds one-to-one to the recommendation terminal 2A, identification of the pertinent recommender ID means identification of the recommendation terminal 2A existing in the search area indicated by the acquisition request, that is, the pertinent terminal.

Then, the control unit 107 generates a recommender list which is a list indicative of the pertinent recommender ID. Then, the control unit 107 temporarily stores the recommender list in the recommender list memory unit, and generates the recommender list identifier which is the identifier to identify the temporarily stored recommender list. The control unit 107 sets the generated recommender list as the recommender list identification information (step S612). The control unit 107 may set the recommender list identifier as the recommender list identification information.

Then, the control unit 107 reads the recommended contents ID associated with the pertinent recommender ID (hereinafter, referred to as "pertinent recommended contents ID") from the recommendation information memory unit 105. Then, the control unit 107 performs predetermined statistical processing on the pertinent recommended contents ID, and assigns a priority to the pertinent recommended contents ID based on the result of the predetermined statistical processing (step S613).

In the present embodiment, as the predetermined statistical processing, the control unit 107 performs the statistical processing of counting the number of recommenders providing (registering) the pertinent recommended contents ID for each pertinent recommended contents ID with reference to the recommendation information memory unit 105. Then, the control unit 107 assigns higher priorities to the pertinent recommended contents IDs with larger numbers of recommenders.

For example, when a pertinent recommended contents ID "ΔX○○" and a pertinent recommended contents ID "○ΔΔΔΔ" are identified as the pertinent recommended contents IDs, the number of recommenders registering the pertinent recommended contents ID "ΔX○○" is five and the number of recommenders registering the pertinent recommended contents ID "○ΔΔΔΔ" is one, the control unit 107 assigns the highest priority to the pertinent recommended contents ID "ΔX○○" and assigns the second highest priority to the pertinent recommended contents ID "○ΔΔΔΔ".

Then, the control unit 107 generates recommended contents information indicative of the recommender list identification information and the pertinent recommended contents IDs assigned with the priorities, and transmits the recommended contents information to the contents use terminal 3A which is the source of the acquisition request through the communication unit 101 (step S614).

At the contents use terminal 3A, when receiving the recommended contents information through the communication unit 3A1, the control unit 3A6 transmits the pertinent recommended contents IDs indicated by the recommended contents information to the contents providing server 400 through the communication unit 3A1 (step S615).

At the contents providing server 400, when receiving the pertinent recommended contents IDs through the communication unit 401, the contents-related information memory unit 404 searches for the relevant information of the contents corresponding to the received pertinent recommended contents IDs with reference to the contents-related information memory unit 404 (step S616).

Then, the contents providing unit 403 transmits the searched relevant information of the contents to the contents use terminal 3A which is the source of the pertinent recommended contents IDs through the communication unit 401 (step S617).

At the contents use terminal 3A, when receiving the relevant information of the contents through the communication unit 3A1, the control unit 3A6 displays (the list of) the relevant information of the contents on the display unit 3A3 in decreasing order of priorities assigned to the pertinent recommended contents IDs corresponding to the relevant information of the contents (step S618).

Then, when the contents user using the contents use terminal 3A inputs to the input unit 3A5 a download instruction input on the pertinent recommended contents ID corresponding to, of the relevant information of the contents displayed on the display unit 3A3, the relevant information of the contents that the contents user desires to download (step S619), the input unit 3A5 outputs the download instruction input to the control unit 3A6.

When accepting the download instruction input, the control unit 3A6 generates a download request indicative of the pertinent recommended contents ID on which the acquisition instruction is provided and the recommender list identification information indicated by the recommended contents information, and transmits the download request to the contents providing server 400 through the communication unit 3A1 (step S620).

At the contents providing server 400, when receiving the download request through the communication unit 401, the contents providing unit 403 holds the download request, reads the contents requested by the download request from the contents memory unit 402, and transmits the contents to the contents use terminal 3A which is the source of the download request (step S621).

At the contents use terminal 3A, when receiving the contents through the communication unit 3A1, the control unit 3A6 stores the contents in the contents memory unit 3A4, and transmits a download completion notification to the contents providing server 400 through the communication unit 3A1 (step S622).

At the contents providing server 400, when receiving the download completion notification through the communication unit 401, the contents providing unit 403 transmits the held download request to the contents recommendation server 100 through the communication unit 401 (step S623). The download request indicates the pertinent recommended contents ID on which the acquisition instruction is provided and the recommender list identification information.

At the contents recommendation server 100, when receiving the download request through the communication unit 101, the control unit 107 identifies the temporarily stored recommender list by using the recommender list identification information in the download request, and identifies the recommender ID associated with the pertinent recommended contents ID in the download request (hereinafter, referred to as "remuneration object recommender ID") from the recommender IDs indicated by the recommender list with reference to the recommendation information memory unit 105. Then, the control unit 107 searches for the remuneration object recommender ID among the recommender IDs in the remuneration information memory unit 106 (step S624).

Then, the control unit 107 adds predetermined remuneration information so as to be associated with the remuneration object recommender ID in the remuneration information memory unit 106 (step S625).

In the present embodiment, the control unit 107 uses predetermined service points as the predetermined remuneration information. Moreover, when there is more than one remuneration object recommender ID, the control unit 107 generates distribution points by dividing the predetermined points by the number of remuneration object recommender IDs, and adds (registers) the distribution points so as to be associated with the remuneration object recommender IDs in the remuneration information memory unit 106.

Then, the control unit 107 transmits remuneration addition information to the effect that the remuneration has been added, to the recommendation terminal 2A identified by the remuneration object recommender ID through the communication unit 101 (step S626).

Next, advantages of the present embodiment will be described.

According to the present embodiment, the location information acquisition unit 102 acquires the location information indicative of the location of the recommendation terminal 2A. The location information memory unit 103 stores the location information acquired by the location information acquisition unit 102. The recommendation information memory unit 105 stores the recommender's recommended contents ID (recommendation information).

When receiving the acquisition request to identify the search area from the contents use terminal 3A, the control unit 107 identifies the pertinent terminal which is the recommendation terminal 2A existing in the search area with reference to the location information memory unit 103. Then, the control unit 107 identifies the pertinent recommendation information which is the recommendation information of the recommender using the pertinent terminal with reference to the recommendation information memory unit 105. Then, the control unit 107 transmits the pertinent recommendation information to the contents use terminal 3A which is the source of the acquisition information.

Therefore, when a location where people with a similar attribute gather is specified as the search area, the recommended contents IDs recommended by people with the similar attribute actually coming to the location can be obtained. Consequently, the reliability of the attribute of the people providing the recommended contents ID acquired by the contents user can be enhanced, whereby the reduction in the reliability of the recommended contents ID (recommendation information) from the recommenders can be prevented.

The above-described advantages are also produced by the contents recommendation server 100 including the location information acquisition unit 102, the location information memory unit 103, the recommendation information memory unit 105 and the control unit 107.

FIG. 7 is a view showing the contents recommendation server including the location information acquisition unit 102, the location information memory unit 103, the recommendation information memory unit 105 and the control unit 107.

Moreover, in the present embodiment, more than one recommendation terminal 2A is present, the control unit 107 performs the predetermined statistical processing on the pertinent recommended contents ID, assigns a priority to the pertinent recommended contents ID based on the result of the predetermined statistical processing, and transmits the pertinent recommended contents ID assigned with the priority to the contents use terminal 3A which is the source of the acquisition information.

Therefore, a priority in accordance with the predetermined statistical processing can be assigned to the pertinent recommended contents ID.

In the present embodiment, as the predetermined statistical processing, the control unit 107 performs the count statistical processing of counting the number of recommenders providing the pertinent recommended contents ID for each pertinent recommended contents ID. Then, the control unit 107 assigns higher priorities to the pertinent recommended contents IDs with larger numbers of recommenders.

The contents identified by the pertinent recommended contents IDs with a large number of recommenders are highly likely contents that deserve to be obtained. Therefore, it is possible to assign a high priority to contents that deserve to be obtained.

Since the acquisition request also indicates the location of the contents use terminal 3A which is the source of the acquisition request, the control unit 107 may perform the following processing as the predetermined statistical processing:

With reference to the location information memory unit 103, the control unit 107 performs, for each pertinent recommended contents ID, distance statistical processing of calculating the distance between the location of the pertinent terminal (recommendation terminal 2A) of the recommender providing the pertinent recommended contents ID in the location information memory unit 103 and the location of the contents use terminal 3A indicated by the search area information. When the distance statistical processing is used as the predetermined statistical processing, the control unit 3A6 assigns, for example, higher priorities to pertinent recommended contents IDs with shorter calculated distances.

In this case, higher priorities are assigned to pertinent recommended contents IDs provided by recommenders using pertinent terminals (recommendation terminals 2A) closer to the contents use terminal 3A. In this case, it is desirable that a mobile terminal such as a mobile telephone be used as the contents use terminal 3A.

In the present embodiment, when the recommended contents information is transmitted from the contents recommendation server 100 to the contents use terminal 3A at step S614, it may be transmitted to the contents use terminal 3A after converted to the relevant information of the contents corresponding to the pertinent recommended contents ID by way of the contents providing server 400.

Moreover, in the present embodiment, when the recommender list identifier is used as the recommender list identification information, since the recommender ID itself is not transmitted to the contents use terminal 3A, the personal information (recommender ID) of the recommender can be protected.

Moreover, the recommender list where a recommender ID is associated with each contents ID may be used as the recommender list identification information. In this case, the contents use terminal 3A can display the recommender ID of each contents by using the recommended IDs indicated by the recommender list. Further, in this case, the recommender IDs indicated by the recommender list may be converted to the recommenders' names.

The contents recommendation server 100 shown in FIG. 2 may be implemented by a computer. In this case, the computer reads and executes a program recorded on a computer-readable recording medium such as a CD-ROM (Compact Disk Read Only Memory) to thereby function as the communication unit 101, the location information acquisition unit 102, the location information memory unit 103, the recommendation information acquisition unit 104, the recommendation information memory unit 105, the remuneration information memory unit 106 and the control unit 107. The recording medium is not limited to a CD-ROM but may be changed as appropriate.

(Second Embodiment)

Next, a second embodiment of the present invention will be described.

Figure 8:
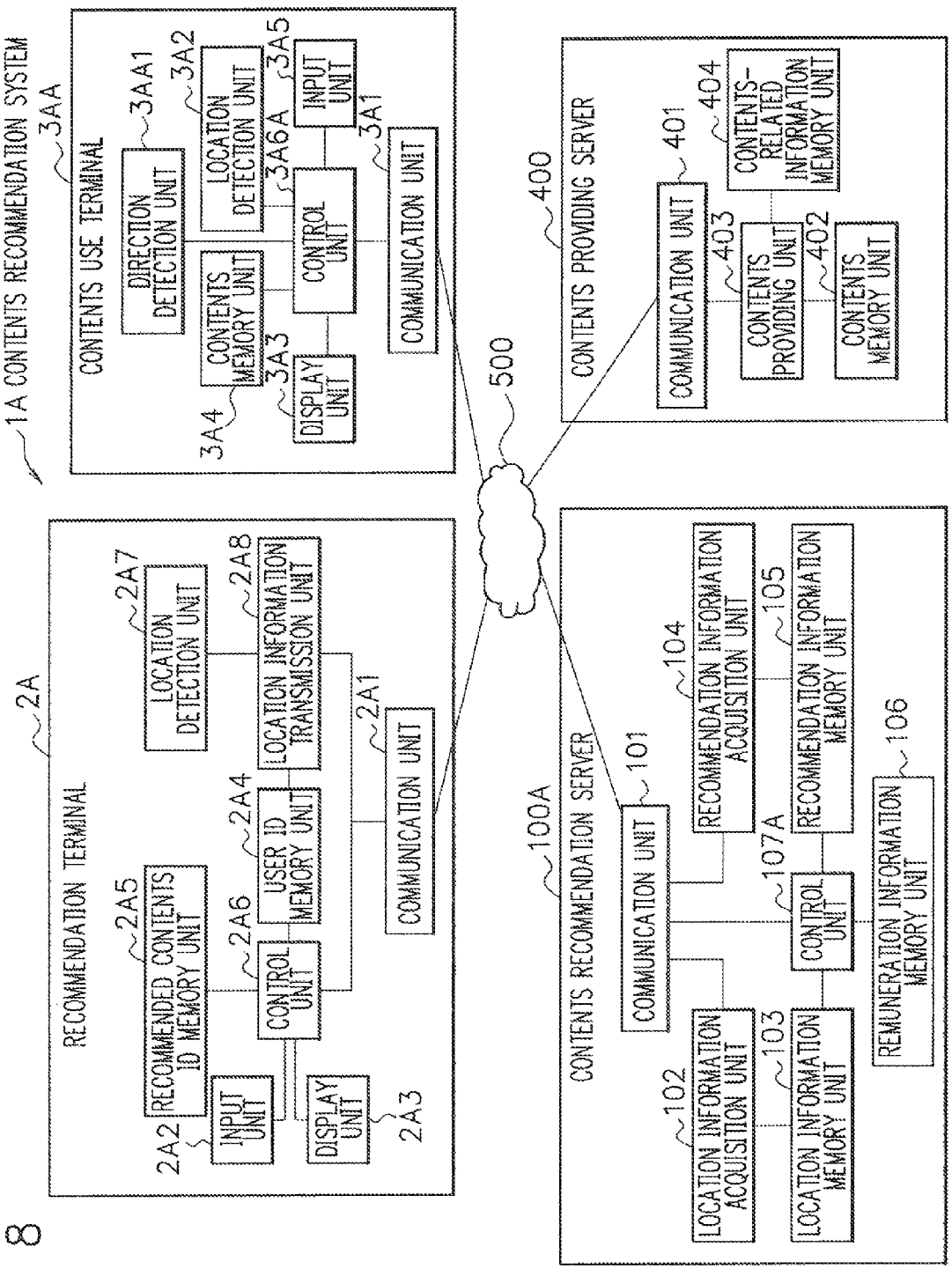
FIG. 8 A block diagram showing a contents recommendation system 1A having a contents recommendation server 100A of a second embodiment of the present invention.

FIG. 8 is a block diagram showing a contents recommendation system 1A having a contents recommendation server 100A of the second embodiment of the present invention.

In FIG. 8, elements having the same structures as those shown in FIG. 2 are denoted by the same reference numerals. Hereinafter, the contents recommendation system 1A shown in FIG. 8 will be described with a focus on differences from the contents recommendation system 1 shown in FIG. 2.

The contents recommendation system 1A is different from the contents recommendation system 1 in that a contents use terminal 3AA is used instead of the contents use terminal 3A and that a contents recommendation server 100A is used instead of the contents recommendation server 100.

The contents use terminal 3AA includes a direction detection unit 3AA1 in addition to the elements of the contents use terminal 3A, and has a control unit 3A6A instead of the control unit 3A6.

The direction detection unit 3AA1 has a magnetic sensor, and detects the direction of the contents use terminal 3AA.

When accepting the acquisition instruction input, the control unit 3A6A acquires the reference information which is the result of the detection by the location detection unit 3A2 from the location detection unit 3A2, and acquires direction information which is the result of the detection by the direction detection unit 3AA1 from the direction detection unit 3AA1. The reference information is an example of the reference location information indicative of the reference location in the search area.

When acquiring the reference information and the direction information, the control unit 3A6A generates an acquisition request indicative of the area information indicative of the search area identified with reference to the location indicated by the reference information, the reference information and the direction information, and transmits the acquisition request to the contents recommendation server 100A through the communication unit 3A1.

The operation of the control unit 3A6A is similar to the operation of the control unit 3A6 except for the operation when the acquisition instruction input is accepted.

The contents recommendation server 100A is an example of the recommendation information providing device, and is different from the contents recommendation server 100 in that a control unit 107A is provided instead of the control unit 107.

The control unit 107A is an example of the control means.

When receiving the acquisition request indicative of the area information, the reference information and the direction information, the control unit 107A identifies as the pertinent terminal the recommendation terminal 2A existing in the direction of the contents use terminal 3AA from the reference location in the search area with reference to the location information memory unit 103.

Figure 9:
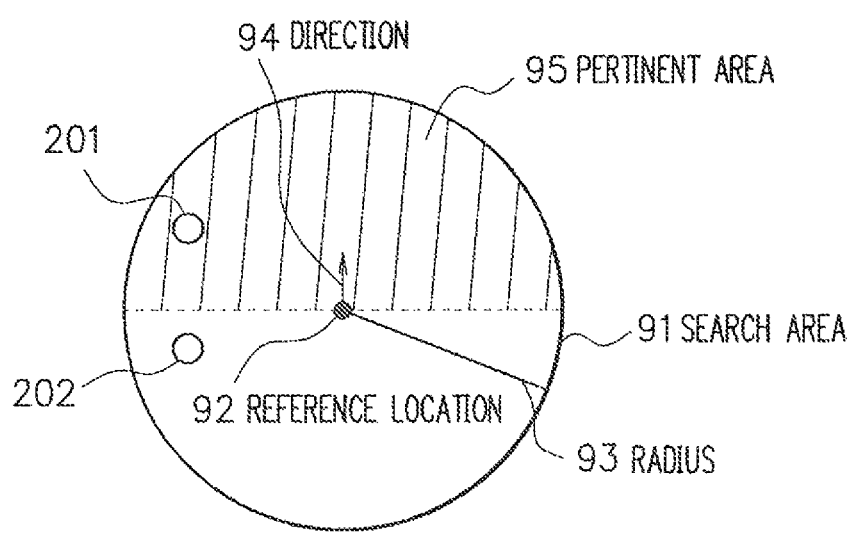
FIG. 9 A view for explaining an example in which a control unit 107A identifies a pertinent terminal.

FIG. 9 is a view for explaining an example in which the control unit 107A identifies the pertinent terminal.

In FIG. 9, a search area 91 is a circular area identified by a radius 93 with a reference location 92 at the center.

The control unit 107A identifies, in the search area 91, a pertinent area 95 (the area shown by hatching in FIG. 9) defined by the direction 94 of the contents use terminal 3AA indicated by the direction information in the reference location 92, and identifies the recommendation terminal 2A existing in the pertinent area 95 as the pertinent terminal with reference to the location information memory unit 103.

The operation of the control unit 107A is similar to the operation of the control unit 107 except for the operation from the reception of the acquisition request indicative of the area information, the reference information and the direction information to the identification of the pertinent terminal. For example, the control unit 107A performs the count statistical processing or the distance statistical processing as the predetermined statistical processing.

According to the present embodiment, when receiving the acquisition request indicative of the area information, the reference information and the direction information from the contents use terminal 3AA, the control unit 107A identifies as the pertinent terminal the recommendation terminal 2A existing in the direction of the contents use terminal 3AA from the reference location in the search area with reference to the location information memory unit 103.

Therefore, the pertinent terminal is switched by changing the direction of the contents use terminal 3AA, whereby the pertinent recommended contents ID is changed and the priority assigned to the pertinent recommended contents ID is also changed. Consequently, the area where the pertinent terminal is searched for can be easily changed by changing the direction of the contents use terminal 3AA.

The contents recommendation server 100A shown in FIG. 8 may be implemented by a computer. In this case, the computer reads and executes a program recorded on a computer-readable recording medium to thereby function as the communication unit 101, the location information acquisition unit 102, the location information memory unit 103, the recommendation information acquisition unit 104, the recommendation information memory unit 105, the remuneration information memory unit 106 and the control unit 107A.

(Third Embodiment)

Next, a third embodiment of the present invention will be described.

FIG. 10 is a block diagram showing a contents recommendation system 1B having a contents recommendation server 100B of the third embodiment of the present invention.

In FIG. 10, elements having the same structures as those shown in FIG. 2 are denoted by the same reference numerals. Hereinafter, the contents recommendation system 1B shown in FIG. 10 will be described with a focus on differences from the contents recommendation system 1 shown in FIG. 2.

The contents recommendation system 1B is different from the contents recommendation system 1 in that a contents recommendation server 100B is used instead of the contents recommendation server 100 and that a recommendation terminal 2AB is used instead of the recommendation terminal 2A.

The contents recommendation server 100B is an example of the recommendation information providing device, and is different from the contents recommendation server 100 in that a control unit 107B is provided instead of the control unit 107, that the location information acquisition unit 102 and the location information memory unit 103 are omitted and that a recommendation terminal information memory unit (not shown) prestoring recommendation terminal information indicative of the recommendation terminal serving as the source of the acquisition request is provided.

The control unit 107B is an example of the control means.

When receiving the acquisition request from the contents use terminal 3A, the control unit 107B transmits the acquisition request to each recommendation terminal 2AB indicated by the recommendation terminal information as the destination in the recommendation terminal information memory unit. Then, when receiving a response from the pertinent terminal which is the recommendation terminal 2AB existing in the search area, the control unit 107B identifies the pertinent recommended contents ID (pertinent recommendation information) which is the recommended contents ID of the recommender using the pertinent terminal with reference to the recommendation information memory unit 105.

In the present embodiment, the control unit 107B sets the recommendation terminal that returns a response within a predetermined time after the transmission of the acquisition request as the reference object of the recommendation information memory unit 105. The predetermined time may be set as appropriate.

Moreover, the control unit 107B generates a recommender list indicative of the pertinent recommender ID for identifying the pertinent terminal, temporarily stores the recommender list in the recommender list memory unit, and assigns a recommender list identifier to each temporarily stored recommender list. Then, the control unit 107B sets the recommender list identifier or the recommender list as the recommender list identification information. In the present embodiment, the control unit 107B uses the recommender list identifier as the recommender list identification information.

Then, the control unit 107B transmits the recommender list identification information to the contents use terminal 3A which is the source of the acquisition request together with the recommended contents information indicative of the pertinent recommended contents ID.

The control unit 107B may, like the control unit 107, perform the predetermined statistical processing on the pertinent recommended contents ID, assign a priority to the pertinent recommended contents ID based on the result of the predetermined statistical processing and transmit the recommended contents information indicative of the pertinent recommended contents ID assigned with the priority to the contents use terminal 3A which is the source of the acquisition request together with the recommender list identification information.

Moreover, the control unit 107B executes steps S624 to S626 like the control unit 107.

The recommendation terminal 2AB is different from the recommendation terminal 2A in that a control unit 2A6B is used instead of the control unit 2A6 and that the location information transmission unit 2A8 is omitted. In the recommendation terminal 2AB, the location detection unit 2A7 is an example of the location acquisition means.

The control unit 2A6B is an example of the response means.

The control unit 2A6B has the following function in addition to the function possessed by the control unit 2A6.

When receiving the acquisition request from the contents recommendation server 100B, the control unit 2A6B transmits a response to the contents recommendation server 100B when the location of the own terminal (recommendation terminal 2AB) indicated by the result of the detection by the location detection unit 2A7 is within the search area identified by the acquisition request.

According to the present embodiment, when receiving the acquisition request from the contents use terminal 3A, the control unit 107B in the contents recommendation server 100B transmits the acquisition request to the recommendation terminal 2AB.

When receiving the acquisition request from the contents recommendation server 100B, the control unit 2A6B in the recommendation terminal 2AB transmits a response to the contents recommendation server 100B when the location of the own terminal indicated by the result of the detection by the location detection unit 2A7 is within the search area identified by the acquisition request.

When receiving the response from the pertinent terminal which is the recommendation terminal 2AB existing the search area, the control unit 107B in the contents recommendation server 100B identifies the pertinent recommended contents ID (pertinent recommendation information) which is the recommended contents ID of the recommender using the pertinent terminal with reference to the recommendation information memory unit 105. Then, the control unit 107B transmits the recommended contents information indicative of the pertinent recommended contents ID to the contents use terminal 3A which is the source of the acquisition request.

For this reason, in the present embodiment, the location information indicative of the location of the recommendation terminal 2AB is not periodically collected in the contents recommendation server 100B. The location information indicative of the location of the recommendation terminal 2AB is also personal information indicative of the behavioral pattern of the recommender using the recommendation terminal 2AB. For this reason, according to the present embodiment, the personal information of the recommender using the recommendation terminal 2AB can be protected.

Moreover, in the present embodiment, since the recommender list identifier is used as the recommender list identification information, the control unit 107B can identify the remuneration object recommender ID without providing the contents use terminal with the recommender ID.

The contents recommendation server 100B shown in FIG. 10 may be implemented by a computer. In this case, the computer reads and executes a program recorded on a computer-readable recording medium to thereby function as the communication unit 101, the recommendation information acquisition unit 104, the recommendation information memory unit 105, the remuneration information memory unit 106 and the control unit 107B.

Moreover, the recommendation terminal 2AB shown in FIG. 10 may be implemented by a computer. In this case, the computer reads and executes a program recorded on a computer-readable recording medium to thereby function as the communication unit 2A1, the input unit 2A2, the display unit 2A3, the user ID memory unit 2A4, the recommended contents ID memory unit 2A5, the control unit 2A6B and the location detection unit 2A7.

(Fourth Embodiment)

Next, a fourth embodiment of the present invention will be described.

Figure 11:
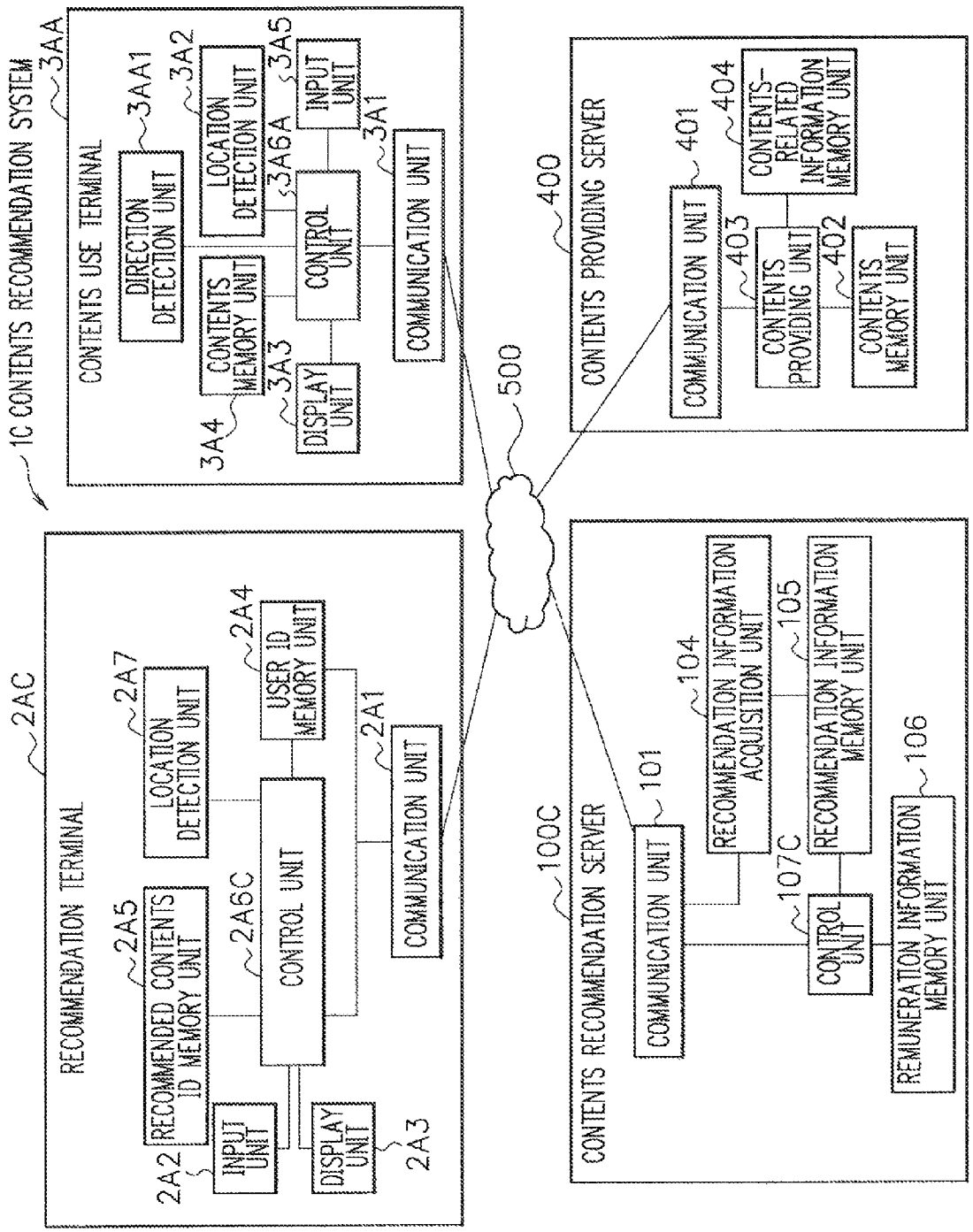
FIG. 11 A block diagram showing a contents recommendation system 1C having a contents recommendation server 100C of a fourth embodiment of the present invention.

FIG. 11 is a block diagram showing a contents recommendation system 1C having a contents recommendation server 100C of the fourth embodiment of the present invention.

In FIG. 11, elements having the same structures as those shown in FIGS. 8 and 10 are denoted by the same reference numerals. Hereinafter, the contents recommendation system 1C shown in FIG. 11 will be described with a focus on differences from the contents recommendation system 1B shown in FIG. 10.

The contents recommendation system 1C is different from the contents recommendation system 1B in that the contents use terminal 3AA (see FIG. 8) is used instead of the contents use terminal 3A, that the contents recommendation server 100C is used instead of the contents recommendation server 100B and that a recommendation terminal 2AC is used instead of the recommendation terminal 2AB.

The contents recommendation server 100C is an example of the recommendation information providing device, and is different from the contents recommendation server 100B in that a control unit 107C is provided instead of the control unit 107B.

The control unit 107C is an example of the control means.

When receiving the acquisition request indicative of the area information, the reference information and the direction information from the contents use terminal 3AA, the control unit 107C transmits the acquisition request to each recommendation terminal 2AC indicated as the source by the recommendation terminal information in the recommendation terminal information memory unit.

Then, when receiving a response from the recommendation terminal 2AC existing in the direction of the contents use terminal 3AA from the reference location in the search area identified by the acquisition request, the control unit 107C identifies the recommendation terminal 2AC having transmitted the response as the pertinent terminal.

Then, the control unit 107C identifies the pertinent recommended contents ID (pertinent recommendation information) which is the recommended contents ID of the recommender using the pertinent terminal with reference to the recommendation information memory unit 105.

In the present embodiment, the control unit 107C identifies the recommendation terminal receiving the response within a predetermined time after the transmission of the acquisition request as the reference object of the recommendation information memory unit, that is, the pertinent terminal. The predetermined time may be set as appropriate.

Then, the control unit 107C generates a recommender list indicative of the pertinent recommender ID for identifying the pertinent terminal, temporarily stores the recommender list in the recommender list memory unit, and assigns a recommender list identifier to each temporarily stored recommender list. Then, the control unit 107C sets the recommender list identifier or the recommender list as the recommender list identification information. In the present embodiment, the control unit 107C uses the recommender list identifier as the recommender list identification information.

Then, the control unit 107C transmits the recommender list identification information to the contents use terminal 3AA which is the source of the acquisition request together with the recommended contents information indicative of the pertinent recommended contents ID.

The control unit 107C may, like the control unit 107, perform the predetermined statistical processing on the pertinent recommended contents ID, assign a priority to the pertinent recommended contents ID based on the result of the predetermined statistical processing and transmit the recommended contents information indicative of the pertinent recommended contents ID assigned with the priority to the contents use terminal 3AA which is the source of the acquisition request together with the recommender list identification information.

Moreover, the control unit 107C executes steps S624 to S626 like the control unit 107.

The recommendation terminal 2AC is different from the recommendation terminal 2AB in that a control unit 2A6C is used instead of the control unit 2A6B. In the recommendation terminal 2AC, the location detection unit 2A7 is an example of the location acquisition means.

The control unit 2A6C is an example of the response means.

The control unit 2A6C has the following function in addition to the function possessed by the control unit 2A6.

When receiving the acquisition request from the contents recommendation server 100C, the control unit 2A6C transmits a response to the contents recommendation server 100C when the location of the own terminal (recommendation terminal 2AB) indicated by the result of the detection by the location detection unit 2A7 is present in the direction of the contents use terminal 3AA from the reference location in the search area identified by the acquisition request.

Now, referring to FIG. 9, an example of a determination as to whether the location of the own terminal (recommendation terminal 2AB) is present in the direction of the contents use terminal 3AA from the reference location in the search area identified by the acquisition request or not will be described.

Based on the acquisition request, the control unit 2A6C identifies the pertinent area 95 (the area shown by hatching in FIG. 9) defined by the direction 94 of the contents use terminal 3AA indicated by the direction information in the reference location 92 in the search area 91.

Then, the control unit 2A6C determines whether the location of the own terminal (recommendation terminal 2AB) is within the pertinent area 95 or not.

According to the present embodiment, when receiving the acquisition request from the contents use terminal 3AA, the control unit 107C in the contents recommendation server 100C transmits the acquisition request to the recommendation terminal 2AC.

When receiving the acquisition request from the contents recommendation server 100C, the control unit 2A6C in the recommendation terminal 2AC transmits a response to the contents recommendation server 100C when the location of the own terminal indicated by the result of the detection by the location detection unit 2A7 is present in the direction of the contents use terminal 3AA from the reference location in the search area identified by the acquisition request.

When receiving the response, the control unit 107C in the contents recommendation server 100C identifies the pertinent recommended contents ID (pertinent recommendation information) which is the recommended contents ID of the recommender using the pertinent terminal having transmitted the response with reference to the recommendation information memory unit 105. Then, the control unit 107C transmits the recommended contents information indicative of the pertinent recommended contents ID to the contents use terminal 3AA which is the source of the acquisition request.

For this reason, the personal information of the recommender using the recommendation terminal 2AB can be protected, and the area where the pertinent terminal is searched for can be easily changed by changing the direction of the contents use terminal 3AA.

The contents recommendation server 100C shown in FIG. 11 may be implemented by a computer. In this case, the computer reads and executes a program recorded on a computer-readable recording medium to thereby function as the communication unit 101, the recommendation information acquisition unit 104, the recommendation information memory unit 105, the remuneration information memory unit 106 and the control unit 107C.

Moreover, the recommendation terminal 2AC shown in FIG. 11 may be implemented by a computer. In this case, the computer reads and executes a program recorded on a computer-readable recording medium to thereby function as the communication unit 2A1, the input unit 2A2, the display unit 2A3, the user ID memory unit 2A4, the recommended contents ID memory unit 2A5, the control unit 2A6C and the location detection unit 2A7.

While in the above-described embodiments, the control unit 3A6 or the control unit 3A6A in the contents use terminal displays (the list of) the relevant information of the contents corresponding to the pertinent recommended contents IDs indicated by the recommended contents information on the display unit 3A3 in decreasing order of priorities, the relevant information of the contents may be displayed on the display unit 3A3 so that the information with higher priorities are displayed in larger sizes (character sizes or icon sizes).

Moreover, in the above-described embodiments, (the list of) the relevant information of the contents corresponding to the pertinent recommended contents ID indicated by the recommended contents information may be displayed on the contents use terminal or a glass-like display supplied with the contents use terminal by using AR (augmented reality). Since AR is a known technology, a detailed description thereof is omitted.

Moreover, in the above-described embodiments, the control unit 107, 107A, 107B or 107C in the contents recommendation server does not have to perform the predetermined statistical processing on the pertinent recommended contents ID or assign a priority to the pertinent recommended contents ID.

While in the above-described embodiments, the recommendation information memory unit 105 in the contents recommendation server stores the recommended contents ID transmitted from the recommendation terminal 2A, it may store the recommended contents ID recommended by the recommender using the recommendation terminal 2A which ID is transmitted from a terminal other than the recommendation terminal 2A.

Moreover, in the above-described embodiments, the name or the icon of the contents may be used as the recommended contents ID (contents identification information). In this case, the recommended contents ID (contents identification information) also serves as the relevant information of the contents. Therefore, the contents use terminal can obtain effects similar to displaying the relevant information of the contents by displaying the pertinent recommended contents ID, and consequently, in this case, steps S615, S616 and S617 shown in FIG. 6B can be omitted.

Moreover, in the above-described embodiments, by using, for example, a circular area with a radius of approximately 1 mm as the search area, the contents use terminal 3A or 3AA can display only the relevant information of the contents corresponding to the recommended contents ID recommended by the recommender in front of the contents user. The size of the search area may be changed as appropriate.

Figure 12:
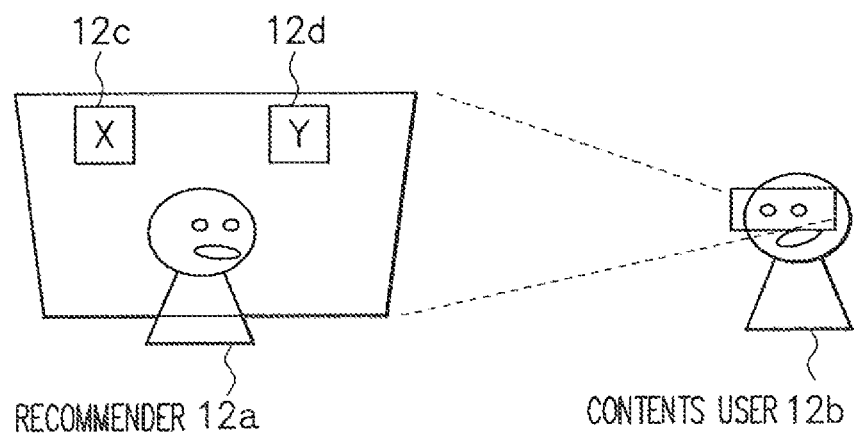
FIG. 12 A view showing a technology of displaying pertinent recommended contents ID by using AR.

FIG. 12 is a view showing a technology of displaying, by using AR, (the list of) the relevant information of the contents corresponding to the pertinent recommended contents ID recommended by a recommender 12*a*.

In FIG. 12, the relevant information (for example, the icon) 12c or 12d of the contents corresponding to the pertinent recommended contents ID recommended by the recommender 12a is displayed on a glass-like display used by a contents user 12b.

Moreover, instead of periodically transmitting the location information notification, the location information transmission unit 2A8 may transmit the location information notification when the recommendation terminal 2A moves by a predetermined distance or more or when the recommendation terminal 2A crosses a specific border (for example, the boundary of a town).

Moreover, the location information transmission unit 2A8 may process the result of the detection by the location detection unit 2A7 so that the fineness of the location indicated by the result of the detection by the location detection unit 2A7 is rough and use the result of the processing as the information indicative of the reference location of the search area.

For example, the location information transmission unit 2A8 performs the processing of cutting the last digit of the data which is the result of the detection by the location detection unit 2A7 or changing the result of the detection by the location detection unit 2A7 to the town name to which the detection result belongs.

Moreover, while in the second and fourth embodiments, an area of 90 degrees with respect to the direction of the contents use terminal is used as the pertinent area 95 (see FIG. 9), the pertinent area 95 is not limited to the area of 90 degrees with respect to the direction of the contents use terminal but may be changed as appropriate; for example, the angle of 90 degrees may be a different angle (for example, 30 degrees).

Moreover, in the above-described embodiments, the recommendation terminal and the contents use terminal may be incorporated in one terminal.

Moreover, in the above-described embodiments, the contents recommendation server and the contents providing server may be incorporated in one server.

In the above-described embodiments, the illustrated structures are merely examples and the present invention is not limited thereto.

The present invention was described by referring each embodiments, however the present invention does not limited the above-described embodiments. The composition and details may be changed in various ways by the person skilled in the art without departing from the scope of the gist of the present invention. This application is based upon and claims the benefit of priority from Japanese patent application No. 2012-019743, filed on Feb. 1, 2012, the disclosure of which is incorporated herein its entirety by reference.

DESCRIPTION OF REFERENCE NUMERALS 1, 1A, 1B, 1C Contents recommendation system
100, 100A, 100B, 100C Contents recommendation server
101 Communication unit
102 Location information acquisition unit
103 Location information memory unit
104 Recommendation information acquisition unit
105 Recommendation information memory unit
106 Remuneration information memory unit
107, 107A, 107B, 107C Control unit
2A, 2AB, 2AC, 201 to 20m Recommendation terminal
2A1 Communication unit
2A2 Input unit
2A3 Display unit
2A4 User ID memory unit
2A5 Recommended contents ID memory unit
2A6, 2A6B, 2A6C Control unit
2A7 Location detection unit
2A8 Location information transmission unit
3A, 3AA, 301 to 30n Contents use terminal
3A1 Communication unit
3A2 Location detection unit
3A3 Display unit
3A4 Contents memory unit
3A5 Input unit
3A6, 3A6A Control unit
3AA1 Direction detection unit
400 Contents providing server
401 Communication unit
402 Contents memory unit
403 Contents providing unit
404 Contents-related information memory unit
500 Network

The invention claimed is:

1. A recommendation information providing device that communicates with each of a mobile terminal used by a provider providing recommendation information indicative of an object to be recommended by a provider and a requester terminal used by a requester requesting the recommendation information, the recommendation information providing device comprising:
    acquisition means for acquiring a registration request comprising provider identification information for identifying said provider and recommendation information recommended by said provider, from said mobile terminal, and acquiring location information of the mobile terminal;
    memory means for storing the location information acquired by the acquisition means;
    storage means for associating said provider identification information with said recommendation information, and storing them; and
    control means for, when receiving search area information for identifying a search area from the requester terminal, identifying a pertinent terminal which is the mobile terminal existing in the search area with reference to the memory means and transmitting pertinent provider identification information which is the provider identification information of the provider using the pertinent terminal and pertinent recommendation information which is the recommendation information of the provider identified by said pertinent provider identification information to the requester terminal with reference to the storage means.

2. A recommendation information providing device that communicates with each of a mobile terminal used by a provider providing recommendation information indicative of an object to be recommended by a provider and a requester terminal used by a requester requesting the recommendation information, the recommendation information providing device comprising:
    acquisition means for acquiring a registration request comprising provider identification information for identifying said provider and recommendation information recommended by said provider, from said mobile terminal;
    storage means for associating said provider identification information with said recommendation information, and storing them; and
    control means for, when receiving search area information for identifying a search area from the requester terminal, transmitting the search area information to the mobile terminal, and when receiving a response from a pertinent terminal which is the mobile terminal returning a response within a predetermined time and existing in the search area, transmitting pertinent provider identification information which is the provider identification information of the provider using the pertinent terminal and pertinent recommendation information which is the recommendation information of the provider identified by said pertinent provider identification information to the requester terminal with reference to the storage means.

3. The recommendation information providing device according to claim 1, wherein the acquisition means, when said mobile terminal moves by a predetermined distance or crosses a specific border, acquires said location information.

4. The recommendation information providing device according to claim 1, wherein said location information is defined as data indicative of a location so that a fineness of the location is rough or indicative of a regional name to which the location belongs.

5. The recommendation information providing device according to claim 1, wherein the search area information also indicates a location of the requester terminal, and the control means performs predetermined statistical processing on the pertinent recommendation information, assigns a priority to the pertinent recommendation information based on a result of the predetermined statistical processing, and transmits the pertinent recommendation information assigned with the priority with said pertinent provider identification information to the requester terminal, the predetermined statistical processing includes statistical processing of counting a number of providers providing pertinent recommendation information for all recommendation information with reference to the storage means, and assigns higher priorities to pieces of recommendation information with larger numbers of providers.

6. The recommendation information providing device according to claim 1, wherein the recommendation information comprises contents identification information for identifying contents recommended by the provider, and wherein the mobile terminal is more than one in number, and when receiving reference location information indicative of a reference location in the search area and direction information indicative of a direction of the requester terminal together with the search area information from the requester terminal, the control means identifies as the pertinent terminal the mobile terminal existing in the direction of the requester terminal from the reference location in the search area with reference to the memory means, performs predetermined statistical processing on the pertinent contents identification information, assigns a priority to the pertinent contents identification information based on a result of the predetermined statistical processing, and transmits the pertinent contents identification information assigned with the priority with said pertinent provider identification information to the requester terminal.

7. The recommendation information providing device according to claim 2, wherein the recommendation information comprises contents identification information for identifying contents recommended by the provider, and wherein the mobile terminal is more than one in number, and when receiving reference location information indicative of a reference location in the search area and direction information indicative of a direction of the requester terminal together with the search area information from the requester terminal, the control means transmits the search area information, the reference location information and the direction information to the mobile terminal, and when receiving the response from the mobile terminal existing in the direction of the requester terminal from the reference location in the search area, the control means identifies the mobile terminal having transmitted the response as the pertinent terminal, and performs predetermined statistical processing on the pertinent contents identification information, assigns a priority to the pertinent contents identification information based on a result of the predetermined statistical processing, and transmits the pertinent contents identification information assigned with the priority with said pertinent provider identification information to the requester terminal.

8. A mobile terminal that communicates with the recommendation information providing device according to claim 2, the mobile terminal comprising:

transmission means for transmitting the registration request;

location acquisition means for acquiring a location of the mobile terminal;

processing means for processing the date indicative of the location so that the fineness of the location is rough, or changing from the location to the regional name to which the location belongs; and response means for, when receiving the search area information from the recommendation information providing device, transmitting the response to the recommendation information providing device when the processing location of the mobile terminal is within the search area indicated by the search area information.

9. A recommendation information providing method at a recommendation information providing device that communicates with each of a mobile terminal used by a provider providing recommendation information indicative of an object to be recommended by a provider and a requester terminal used by a requester requesting the recommendation information, the recommendation information providing method comprising:

acquiring a registration request comprising provider identification information for identifying said provider and recommendation information recommended by said provider from said mobile terminal, and acquiring location information of the mobile terminal;

storing the acquired location information in memory means;

associating said provider identification information with said recommendation information, and storing them in storage means; and when receiving search area information for identifying a search area from the requester terminal, identifying a pertinent terminal which is the mobile terminal existing in the search area with reference to the memory means, and transmitting pertinent provider identification information which is the provider identification information of the provider using the pertinent terminal and pertinent recommendation information which is the recommendation information of the provider identified by said pertinent provider identification information to the requester terminal with reference to the storage means.

10. A recommendation information providing method at a recommendation information providing device that communicates with each of a mobile terminal used by a provider providing recommendation information indicative of an object to be recommended by a provider and a requester terminal used by a requester requesting the recommendation information, the recommendation information providing method comprising:

acquiring a registration request comprising provider identification information for identifying said provider and recommendation information recommended by said provider from said mobile terminal;

associating said provider identification information with said recommendation information, and storing them in storage means; and when receiving search area information for identifying a search area from the requester terminal, transmitting the search area information to the mobile terminal, and when receiving a response from a pertinent terminal which is the mobile terminal returning a response within a predetermined time and existing in the search area, transmitting pertinent provider identification information which is the provider identification information of the provider using the pertinent terminal and pertinent recommendation information which is the recommendation information of the provider identified by said pertinent provider identification information to the requester terminal with reference to the storage means.

11. A recommendation information provision supporting method at a mobile terminal that communicates with the recommendation information providing device according to claim 2, the recommendation information provision supporting method comprising:

transmission means for transmitting said registration request; and acquiring a location of the mobile terminal; and processing means for, processing the date indicative of said location so that the fineness of the location is rough, or changing from said location to the regional name to which said location belongs; and when receiving the search area information from the recommendation information providing device, transmitting the response to the recommendation information providing device when the processing location of the mobile terminal is within the search area indicated by the search area information.

12. A non-transitory computer-readable recording medium that communicates with each of a mobile terminal used by a provider providing recommendation information indicative of an object to be recommended by a provider and a requester terminal used by a requester requesting the recommendation information, the computer-readable recording medium recording a program for causing a computer to execute:

an acquisition procedure of acquiring registration request comprising provider identification information for identifying said provider and recommendation information recommended by said provider from said mobile terminal, and acquiring location information of the mobile terminal; and a memory procedure of storing the acquired location information to memory means;

a storage procedure of associating said provider identification information with said recommendation information, and storing them in storage means; and a control procedure of, when receiving search area information for identifying a search area from the requester terminal, identifying a pertinent terminal which is the mobile terminal existing in the search area with reference to the memory means and transmitting pertinent provider identification information which is the provider identification information of the provider using the pertinent terminal and pertinent recommendation information which is the recommendation information of the provider identified by said pertinent provider identification information to the requester terminal with reference to the storage means.

13. A non-transitory computer-readable recording medium that communicates with each of a mobile terminal used by a provider providing recommendation information indicative of an object to be recommended by a provider and a requester terminal used by a requester requesting the recommendation information, the computer-readable recording medium recording a program for causing a computer to execute:

an acquisition procedure of acquiring a registration request comprising provider identification information for identifying said provider and recommendation information recommended by said provider from said mobile terminal;

a storage procedure of associating said provider identification information with said recommendation information, and storing them in storage means; and a control procedure of, when receiving search area information for identifying a search area from the requester terminal, transmitting the search area information to the mobile terminal, and when receiving a response from a pertinent terminal which is the mobile terminal, returning a response within a predetermined time and existing in the search area, transmitting pertinent provider identification information which is the provider identification information of the provider using the pertinent terminal and pertinent recommendation information which is the recommendation information of the provider identified by said pertinent provider identification information to the requester terminal with reference to the storage means.

14. A non-transitory computer-readable recording medium that communicates with the recommendation information providing device according to claim 2, the computer-readable recording medium recording a program for causing a computer to execute:

a transmission procedure of transmitting said registration request;

a location acquisition procedure of acquiring a location of the computer;

a processing procedure of, processing the date indicative of said location so that the fineness of the location is rough, or changing from said location to the regional name to which said location belongs; and a response procedure of, when receiving the search area information from the recommendation information providing device, transmitting the response to the recommendation information providing device when the processing location of the computer is within the search area indicated by the search area information.

15. The recommendation information providing device according to claim 5, wherein the search area information also indicates a location of the requester terminal, and the control means performs, as the predetermined statistical processing, statistical processing of counting a distance between a location of the pertinent terminal of the provider providing the pertinent recommendation information and a location of the requester terminal indicated by the search area information for each piece of pertinent recommendation information with reference to the memory means, and assigns higher priorities to pieces of pertinent recommendation information with shorter distances.

\* \* \* \* \*